US012285850B2

(12) United States Patent
Birk

(10) Patent No.: US 12,285,850 B2
(45) **Date of Patent: *Apr. 29, 2025**

(54) REVERSION TRIGGER FOR COMBUSTION-POWERED FASTENER-DRIVING TOOL

(71) Applicant: Illinois Tool Works Inc., Glenview, IL (US)

(72) Inventor: Daniel J. Birk, McHenry, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/495,275

(22) Filed: Oct. 26, 2023

(65) Prior Publication Data

US 2024/0051105 A1 Feb. 15, 2024

Related U.S. Application Data

(60) Continuation of application No. 17/711,516, filed on Apr. 1, 2022, now Pat. No. 11,826,889, which is a continuation of application No. 16/743,538, filed on Jan. 15, 2020, now Pat. No. 11,318,595, which is a division of application No. 15/344,031, filed on Nov. 4, 2016, now Pat. No. 10,543,590, which is a (Continued)

(51) Int. Cl.
*B25C 1/08* (2006.01)
*B25C 1/00* (2006.01)

(52) U.S. Cl.
CPC ................ *B25C 1/08* (2013.01); *B25C 1/008* (2013.01)

(58) Field of Classification Search
CPC ................................. B25C 1/08; B25C 1/008
See application file for complete search history.

(56) References Cited

U.S. PATENT DOCUMENTS 3,964,659 A 6/1976 Eiben et al.
4,351,464 A 9/1982 Fehrs et al.

(Continued)

FOREIGN PATENT DOCUMENTS

EP 1223009 A2 7/2002
EP 1240982 A2 9/2002

(Continued)

OTHER PUBLICATIONS

European Office Action for European Application No. 13 819 185.3, dated Feb. 8, 2018 (4 pages).

(Continued)

*Primary Examiner* — Nathaniel C Chukwurah
(74) *Attorney, Agent, or Firm* — Neal, Gerber & Eisenberg LLP

(57) ABSTRACT

A fastener-driving tool has a housing including a combustion chamber, where the combustion chamber generates combustion for driving a fastener, and a processor associated with the housing and in communication with the combustion chamber. The processor is configured to cause an initial combustion in the combustion chamber and cause a fastener to be driven when a first actuation event and a second actuation event occur, and is configured to cause at least one subsequent combustion in the combustion chamber and cause at least one additional fastener to be driven when only the first actuation event occurs.

20 Claims, 8 Drawing Sheets

Related U.S. Application Data continuation of application No. 13/741,533, filed on Jan. 15, 2013, now Pat. No. 9,486,907.

(56) References Cited

U.S. PATENT DOCUMENTS

| | | | |
|---|---|---|---|
| 4,403,722 | A | 9/1983 | Nikolich |
| 4,483,473 | A | 11/1984 | Wagdy |
| 4,483,474 | A | 11/1984 | Nikolich |
| 4,522,162 | A | 6/1985 | Nikolich |
| RE32,452 | E | 7/1987 | Nikolich |
| 4,679,719 | A | 7/1987 | Kramer |
| 5,133,329 | A | 7/1992 | Rodseth et al. |
| 5,191,861 | A | 3/1993 | Kellerman et al. |
| 5,197,646 | A | 3/1993 | Nikolich |
| 5,263,439 | A | 11/1993 | Doherty et al. |
| 5,605,268 | A | 2/1997 | Hayashi et al. |
| 5,732,870 | A | 3/1998 | Moorman et al. |
| 5,772,096 | A | 6/1998 | Osuka et al. |
| 5,918,788 | A | 7/1999 | Moorman et al. |
| 6,145,724 | A | 11/2000 | Shkolnikov et al. |
| 6,371,348 | B1 | 4/2002 | Canlas et al. |
| 6,382,492 | B1 | 5/2002 | Moorman et al. |
| 6,431,425 | B1 | 8/2002 | Moorman et al. |
| 6,604,664 | B2 | 8/2003 | Robinson |
| 6,691,907 | B1 | 2/2004 | Chang |
| 6,695,193 | B1 | 2/2004 | Chang |
| 6,695,194 | B1 | 2/2004 | Chang |
| 6,857,547 | B1 | 2/2005 | Lee |
| 7,070,080 | B2 | 7/2006 | Lin |
| 7,163,134 | B2 | 1/2007 | Moeller et al. |
| 7,383,974 | B2 | 6/2008 | Moeller et al. |
| 7,469,811 | B2 | 12/2008 | Shima et al. |
| 7,487,898 | B2 | 2/2009 | Moeller et al. |
| 7,510,105 | B2 | 3/2009 | Moeller et al. |
| 7,513,402 | B2 | 4/2009 | Miyashita et al. |
| 7,938,305 | B2 | 5/2011 | Simonelli et al. |
| 7,975,890 | B2 | 7/2011 | Tang |
| 8,011,441 | B2 | 9/2011 | Leimbach et al. |
| 8,011,547 | B2 | 9/2011 | Leimbach et al. |
| 8,313,012 | B2 | 11/2012 | Shima et al. |
| 9,381,663 | B2 | 7/2016 | Maurer |
| 9,550,288 | B2 | 1/2017 | Moore et al. |
| 11,826,889 | B2 * | 11/2023 | Birk ........................ B25C 1/008 |
| 2002/0130154 | A1 | 9/2002 | Wolfberg |
| 2002/0185514 | A1 | 12/2002 | Adams et al. |
| 2005/0173484 | A1 | 8/2005 | Moeller et al. |
| 2005/0173487 | A1 | 8/2005 | Moeller et al. |
| 2007/0131731 | A1 | 6/2007 | Moeller et al. |
| 2009/0314818 | A1 | 12/2009 | Segura |
| 2010/0243699 | A1 | 9/2010 | Largo |
| 2012/0298390 | A1 | 11/2012 | Schieler et al. |

FOREIGN PATENT DOCUMENTS

| | | | |
|---|---|---|---|
| EP | 2450152 | A2 | 5/2012 |
| JP | H08276375 | A | 10/1996 |
| WO | 02051591 | A1 | 7/2002 |

OTHER PUBLICATIONS

International Preliminary Report on Patentability for International Application No. PCT/US2013/077823, dated Jul. 21, 2015 (7 pages).

International Search Report and Written Opinion for International Application No. PCT/US2013/077823, mailed Apr. 8, 2014 (10 pages).

* cited by examiner

REVERSION TRIGGER FOR COMBUSTION-POWERED FASTENER-DRIVING TOOL

PRIORITY CLAIM

This patent application is a continuation of, and claims priority to and the benefit of, U.S. patent application Ser. No. 17/711,516, which was filed on Apr. 1, 2022, now issued as U.S. Pat. No. 11,826,889 on Nov. 28, 2023, which is a continuation of, and claims priority to and the benefit of, U.S. patent application Ser. No. 16/743,538, which was filed on Jan. 15, 2020, now issued as U.S. Pat. No. 11,318,595 on May 3, 2022, which is a divisional of, and claims priority to and the benefit of, U.S. patent application Ser. No. 15/344,031, which was filed on Nov. 4, 2016, now issued as U.S. Pat. No. 10,543,590 on Jan. 28, 2020, which is a continuation of, and claims priority to and the benefit of, U.S. patent application Ser. No. 13/741,533, which was filed on Jan. 15, 2013, now issued as U.S. Pat. No. 9,486,907 on Nov. 8, 2016, the entire contents of each of which are incorporated herein by reference.

BACKGROUND

The present disclosure relates generally to powered, fastener-driving tools, wherein the tools may be electrically powered, pneumatically powered or powder activated, and more particularly to a combustion-powered fastener-driving tool having a trigger control mechanism that is operable in both a sequential actuation mode and a contact actuation mode.

Powered, fastener-driving tools of the type used to drive various fasteners, such as, for example, staples, nails, and the like, typically include a housing, a power source, a supply of fasteners, a trigger mechanism for initiating the actuation of the tool, and a workpiece contact element (also referred to herein as a "workpiece contacting element" or "WCE"). The workpiece contact element is configured to engage or contact a workpiece, and is operatively connected to the trigger mechanism, such that when the workpiece contact element is in fact disposed in contact with the workpiece, and depressed or moved inwardly a predetermined amount with respect to the tool, as a result of the tool being pressed against the workpiece a predetermined amount, the trigger mechanism is enabled to initiate actuation of the fastener-driving tool.

As is well-known in the art, powered, fastener-driving tools normally have two operational modes, and the tool is accordingly provided with some mechanism, such as, for example, a lever, a latch, a switch or the like, for enabling the operator to optionally select one of the two operational modes that the operator desires to use for installing the fasteners. More particularly, in accordance with a first one of the operational modes, known in the industry and art as the sequential or single-actuation mode of operation, the depression or actuation of the trigger mechanism will not in fact initiate the actuation of the tool and the driving of a fastener into the workpiece unless the workpiece contact element is initially depressed against the workpiece. Considered from a different point of view or perspective, in order to operate the powered, fastener-driving tool in accordance with the sequential or single-actuation mode of operation, the workpiece contact element must first be depressed against the workpiece followed by the depression or actuation of the trigger mechanism. Still further, once the particular fastener has in fact been driven into the workpiece, further or repeated depression or actuation of the trigger mechanism will not result in the subsequent driving of additional fasteners into the workpiece unless, and until, the workpiece contact element is permitted to effectively be reset to its original position and once again disposed in contact with, and pressed against, the workpiece prior to the depression or actuation of the trigger mechanism each time the tool is to be actuated so as to drive a fastener into the workpiece.

Alternatively, in accordance with a second operational mode, known in the industry and art as the contact actuation mode of operation, the operator can in fact maintain the trigger mechanism at its depressed position, and subsequently, each time the workpiece contact element is disposed in contact with, and pressed against, the workpiece, the tool will actuate, thereby driving a fastener into the workpiece.

Combustion-powered tools are known in the art. Exemplary tools are manufactured by Illinois Tool Works, Inc. of Glenview, Illinois for use in driving fasteners into workpieces, and are described in commonly assigned patents to Nikolich U.S. Pat. Re. No. 32,452 and U.S. Pat. Nos. 4,522,162; 4,483,473; 4,483,474; 4,403,722; 5,133,329; 5,197,646; 5,263,439; 6,145,724 and 7,383,974, all of which are incorporated by reference herein.

Such tools incorporate an external tool housing enclosing a small internal combustion engine. The engine is powered by a canister of pressurized fuel gas, also called a fuel cell. A battery-powered electronic power distribution unit produces a spark for ignition, and a fan located in a combustion chamber provides for both an efficient combustion within the chamber, while facilitating processes ancillary to the combustion operation of the device. Such ancillary processes include: cooling the engine, mixing the fuel and air within the chamber, and removing, or scavenging, combustion by-products. The engine includes a reciprocating piston with an elongated, rigid driver blade disposed within a single cylinder body.

A valve sleeve is axially reciprocable about the cylinder and, through a linkage, moves to close the combustion chamber when the workpiece contact element at the end of the linkage is pressed against a workpiece. This pressing action also triggers a fuel-metering valve to introduce a specified volume of fuel into the closed combustion chamber. This same movement of the tool against the workpiece causes the fan inside the combustion chamber to turn on and mix the fuel with the air inside the combustion chamber.

Upon the pulling of a trigger, which closes a trigger switch, a spark is generated for igniting a charge of gas in the combustion chamber of the engine, the resulting high pressure inside the chamber causes the combined piston and driver blade to be forced downward to impact a positioned fastener and drive it into the workpiece. Just before the piston impacts a resilient bumper at a lower end of the cylinder, the piston passes an exhaust port, through which some of the exhaust gas is vented. Next, the tool valve sleeve and cylinder absorb heat from the combustion to generate vacuum pressure that pulls the piston back to its uppermost position in the cylinder for the next cycle. Fasteners are fed magazine-style into the nosepiece, where they are held in a properly positioned orientation for receiving the impact of the driver blade.

For efficient operation, it is preferred that the combustion chamber remains sealed until the piston returns to its uppermost or pre-firing position. The amount of time that the combustion chamber remains closed is a function of the operator's work rhythm and is often too short when attempting a repetitive cycle operation, where the trigger remains pulled and the workpiece contact element is rapidly pressed upon the workpiece for fastener driving, and then the tool is quickly lifted and moved to the next fastener location.

In cases where a tool is operated at a much higher cycle rate, the operator can open the combustion chamber during the piston return cycle by removing the tool from the workpiece. This causes the vacuum to be lost, however, and piston travel will stop before reaching the top of the cylinder. This leaves the driver blade in the guide channel of the nosepiece, thereby preventing the nail strip from advancing towards the nose. The net result is no nail in the firing channel and no nail fired in the next shot.

To assure adequate closed combustion chamber dwell time in the sequentially-operated combustion tools identified above, a chamber lockout device is known that is linked to the trigger. This mechanism holds the combustion chamber closed until the operator releases the trigger. This extends the dwell time (during which the combustion chamber is closed) by taking into account the operator's relatively slow musculature response time. In other words, the physical release of the trigger consumes enough time of the firing cycle to assure piston return. The mechanism also maintains a closed chamber in the event of a large recoil event created, for example, by firing into hard wood.

Conventional combustion-powered fastening tools typically operate in the sequential actuation mode. As a result, experienced carpenters typically use the sequentially actuated combustion tool for precision nailing and a different contact actuated tool for non-precision nailing, such as for roofing and decking. A need therefore exists for a single combustion fastener-driving tool that is operable in both a sequential actuation mode and a contact actuation mode.

SUMMARY

Various embodiments of present disclosure provide a new and improved combustion fastener-driving tool which has a trigger control mechanism for alternatively permitting sequential and contact actuation modes of operation.

In an embodiment, a fastener-driving tool has a housing including a combustion chamber, where the combustion chamber generates combustion for driving a fastener, and a processor associated with the housing and in communication with the combustion chamber. The processor is configured to cause an initial combustion in the combustion chamber and cause a fastener to be driven when a first actuation event and a second actuation event occur, and is configured to cause at least one subsequent combustion in the combustion chamber and cause at least one additional fastener to be driven when only the first actuation event occurs.

In another embodiment, a fastener-driving tool has a trigger control mechanism operable in a sequential actuation mode and a contact actuation mode. The tool includes a housing, a workpiece contact element movably connected to the housing, where the workpiece contact element is movable between a rest position and an activated position, a trigger movably connected to the housing, an actuation lever movably connected to the trigger and a control valve including an stem, where the stem is movable between a rest position and an activated position. In the sequential actuation mode, a single fastener is driven into a first location on a workpiece by pressing the workpiece contact element against the workpiece to move the workpiece contact element to the activated position followed by pressing the trigger and causing the actuation lever to contact and move the stem to the activated position. In the contact actuation mode, at least one additional fastener is driven into a second, different location on the workpiece by holding the trigger and pressing the workpiece contact element against the workpiece and causing the actuation lever to contact and move the stem to the activated position.

In a further embodiment, a fastener-driving tool includes a housing, a combustion chamber in the housing, a workpiece contact element movably connected to the housing and movable between a rest position and an activated position, a trigger movably connected to the housing and an actuation lever movably connected to the trigger. In a sequential actuation mode, combustion is generated in the combustion chamber to drive a fastener into a workpiece each time the workpiece contact element and the trigger are each moved from the rest position to the activated position in a designated sequence. In a contact actuation mode, the trigger remains in the activated position and combustion is generated in the combustion chamber to drive at least one additional fastener into the workpiece each time the workpiece contact element is moved to an activated position by depressing the workpiece contact element on the workpiece.

DETAILED DESCRIPTION

Figure 1:
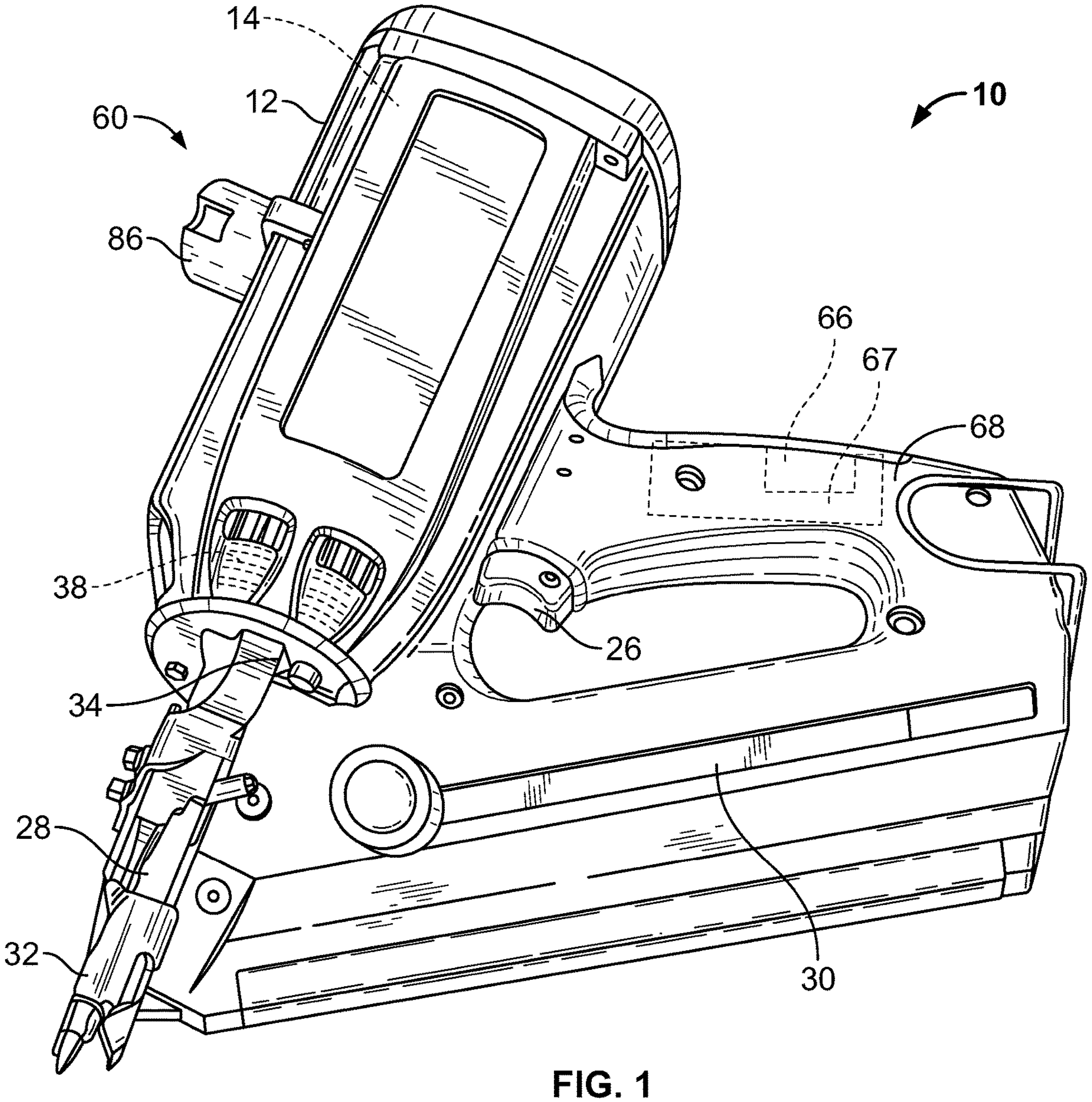
FIG. 1 (Prior Art)
FIG. 1 is a front perspective view of a conventional fastener-driving tool.
Figure 2:
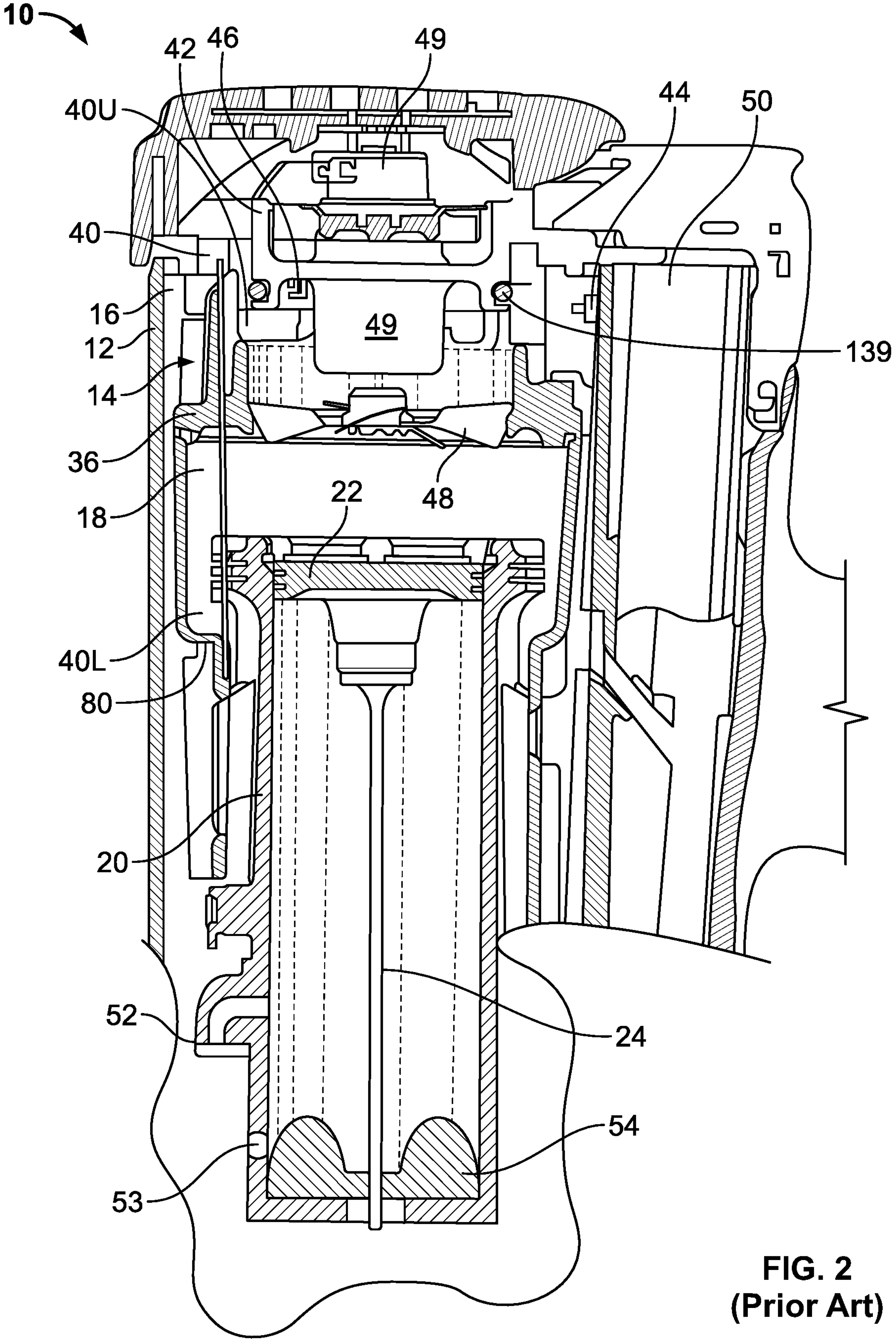
FIG. 2 (Prior Art)
FIG. 2 is a fragmentary vertical cross-section of the tool of FIG. 1 shown in the rest position.

Referring now to FIGS. 1-2, a combustion-powered fastener-driving tool is generally designated 10 and is of the general type described in detail in the patents listed above and incorporated by reference in the present application. A housing 12 of the tool 10 encloses a self-contained internal power source 14 (FIG. 2) within a housing main chamber 16. As is generally known in the art, the power source 14 is powered by internal combustion and includes a combustion chamber 18 that communicates with a cylinder 20. A piston 22 reciprocally disposed within the cylinder 20 is connected to the upper end of a driver blade 24. As shown in FIG. 2, an upper limit of the reciprocal travel of the piston 22 is referred to as a pre-firing or pre-actuating position, which occurs just prior to firing or actuation of the tool, or the ignition of the combustion gases which initiates the downward driving of the driver blade 24 to impact a fastener (not shown) to drive it into a workpiece.

Through depression of a trigger 26, an operator induces combustion within the combustion chamber 18, causing the driver blade 24 to be forcefully driven downward through a nosepiece 28 (FIG. 1). The nosepiece 28 guides the driver blade 24 to strike a fastener that had been delivered into the nosepiece via a fastener magazine 30.

Included in the nosepiece 28 is a workpiece contact element 32, which is connected, through a linkage or upper probe 34 to a reciprocating valve sleeve 36, an upper end of which partially defines the combustion chamber 18. Depression of the tool housing 12 against the workpiece contact element 32 in a downward direction as seen in FIG. 1 (other operational orientations are contemplated as are known in the art), causes the workpiece contact element to move from a rest position to a firing or actuation position. This movement overcomes the normally downward biased orientation of the workpiece contact element 32 caused by a spring 38 (shown hidden in FIG. 1). It is contemplated that the location of the spring 38 may vary to suit the application, and locations displaced farther from the nosepiece 28 are envisioned.

Through the linkage 34, the workpiece contact element 32 is connected to and reciprocally moves with, the valve sleeve 36. In the rest position (FIG. 2), the combustion chamber 18 is not sealed, since there is an annular gap 40 separating the valve sleeve 36 and a cylinder head 42, which accommodates a chamber switch 44 and a spark plug 46. Specifically, there is an upper gap 40U near the cylinder head 42, and a lower gap 40L near the upper end of the cylinder 20. In the preferred embodiment of the present tool 10, the cylinder head 42 also is the mounting point for a cooling fan 48 and a fan motor 49 powering the cooling fan. The fan and at least a portion of the motor extend into the combustion chamber 18 as is known in the art and described in the patents which have been incorporated by reference above. In the rest position depicted in FIG. 2, the tool 10 is disabled from firing because the combustion chamber 18 is not sealed at the top with the cylinder head 42, and the chamber switch 44 is open.

Actuation or firing is enabled when an operator presses the workpiece contact element 32 against a workpiece. This action overcomes the biasing force of the spring 38, causes the valve sleeve 36 to move upward relative to the housing 12, closing the gaps 40U and 40L and sealing the combustion chamber 18 until the chamber switch 44 is activated. This operation also induces a measured amount of fuel to be released into the combustion chamber 18 from a fuel canister 50 (shown in fragment).

Upon a pulling of the trigger 26, the spark plug 46 is energized and produces a spark that ignites the fuel and air mixture in the combustion chamber 18 and propels the piston 22 and the driver blade 24 downward through the cylinder and toward the waiting fastener for entry into the workpiece. As the piston 22 travels down the cylinder, it pushes a rush of air which is exhausted through at least one petal or check valve 52 and at least one vent hole 53 located beyond piston displacement (FIG. 2). At the bottom of the piston stroke or the maximum piston travel distance, the piston 22 impacts a resilient bumper 54 as is known in the art. With the piston 22 beyond the exhaust check valve 52, high pressure gasses vent from the cylinder 20 until near atmospheric pressure conditions are obtained and the check valve 52 closes. Due to internal pressure differentials in the cylinder 20, the piston 22 is returned to the pre-actuation position shown in FIG. 2. Because conventional combustion-powered fastener-driving tools typically only operate in a sequential actuation mode, the above process must be repeated to drive another fastener into the workpiece.

Referring now to FIGS. 3-8, an example combustion-powered nailer 100 includes a trigger control mechanism that enables the nailer to operate in both a sequential actuation mode and a contact actuation mode.

The trigger control mechanism or trigger control assembly, generally indicated by reference number 102, is configured to be mounted upon a housing 104. A workpiece contact element assembly 106 includes a workpiece contact element 108, which is configured to be depressed on contact with a workpiece 101, and a workpiece contact element linkage 110, which is slidably mounted in a reciprocal manner upon the fastener-driving tool housing 104.

Figure 5:
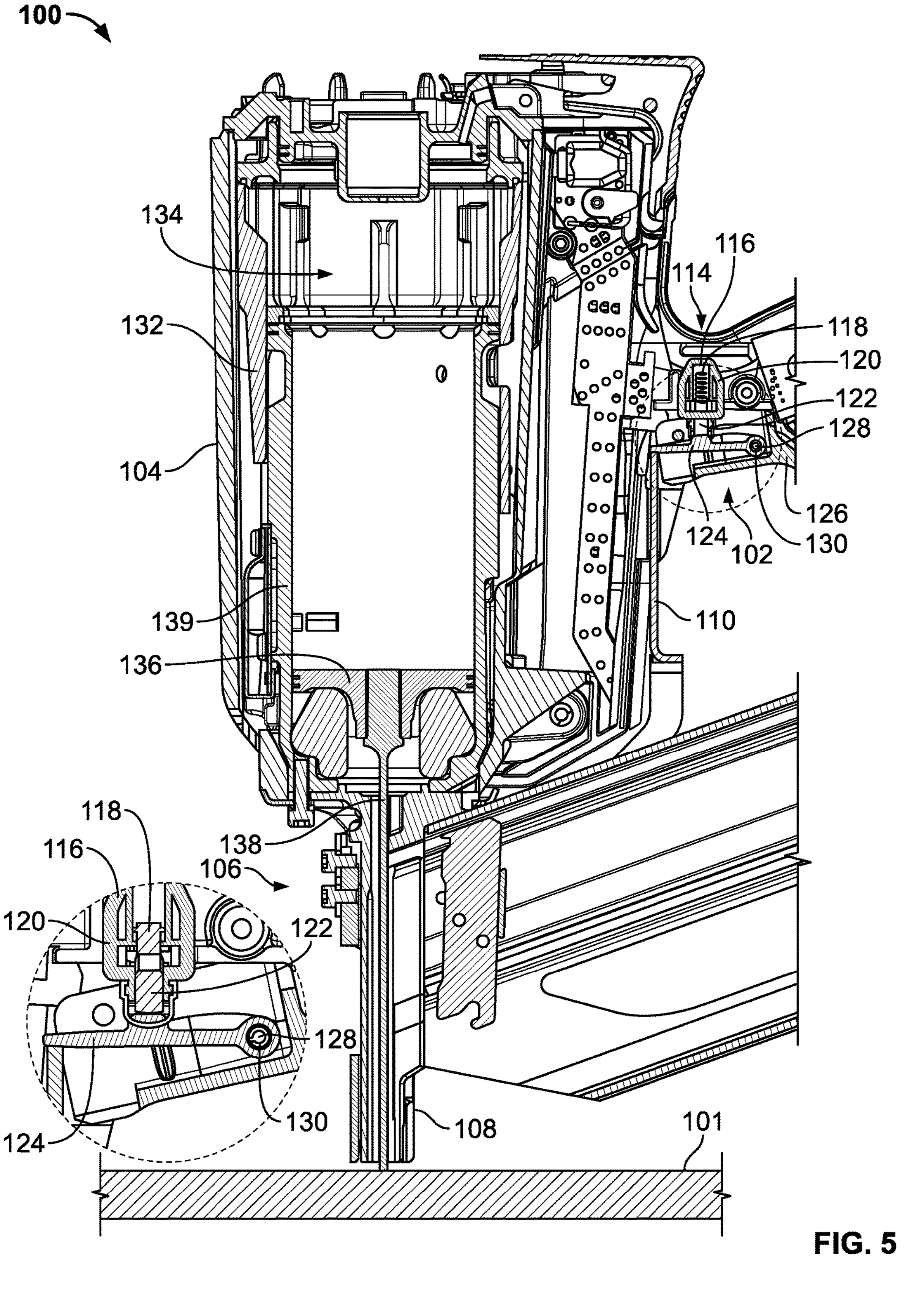
FIG. 5 is a cross-sectional view of the fastener-driving tool of FIG. 3 in the sequential actuation mode, where the workpiece contact element is depressed against a workpiece, the actuation lever has moved to a position adjacent to the trigger assembly and the trigger has been depressed to drive a fastener into the workpiece.

A trigger switch assembly 114 is mounted to the housing 104 so as to initiate either a sequential or a contact actuation operational mode of the fastener-driving tool 100 when the trigger switch assembly is actuated by the trigger control mechanism 102 of the present disclosure as will be described below. More particularly, the trigger switch assembly 114 includes a switch housing 116 biased by a spring 118 and configured to be seated upon a switch seat 120, and a stem 122 configured to be engaged by an actuation lever 124 of the trigger control mechanism 102. The actuation lever 124 is movably connected to a trigger 126 by a pin 128 and is movable between a first position or rest position (FIG. 3) and a second position or activated position (FIG. 5). A bias member, such as spring 130 connected to the pin 128, biases the actuation lever 124 to the rest position.

The operation of the structural components in the sequential actuation mode and the contact actuation mode will now be described.

Figure 3:
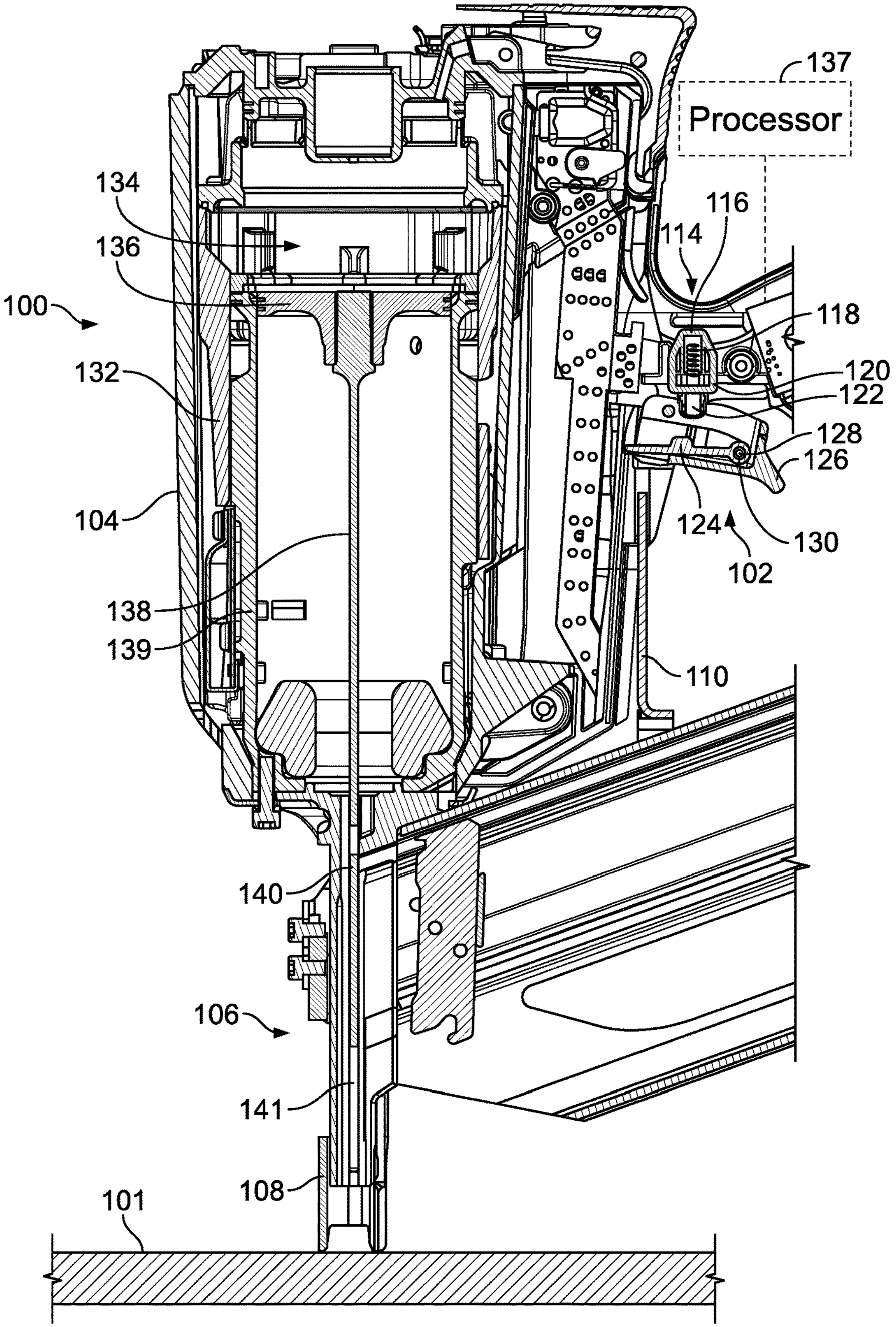
FIG. 3 is a cross-sectional view of a trigger control mechanism for a combustion-powered fastener-driving tool that includes a trigger assembly having an actuation lever where the trigger assembly and the workpiece contact element are in a rest position.
Figure 4:
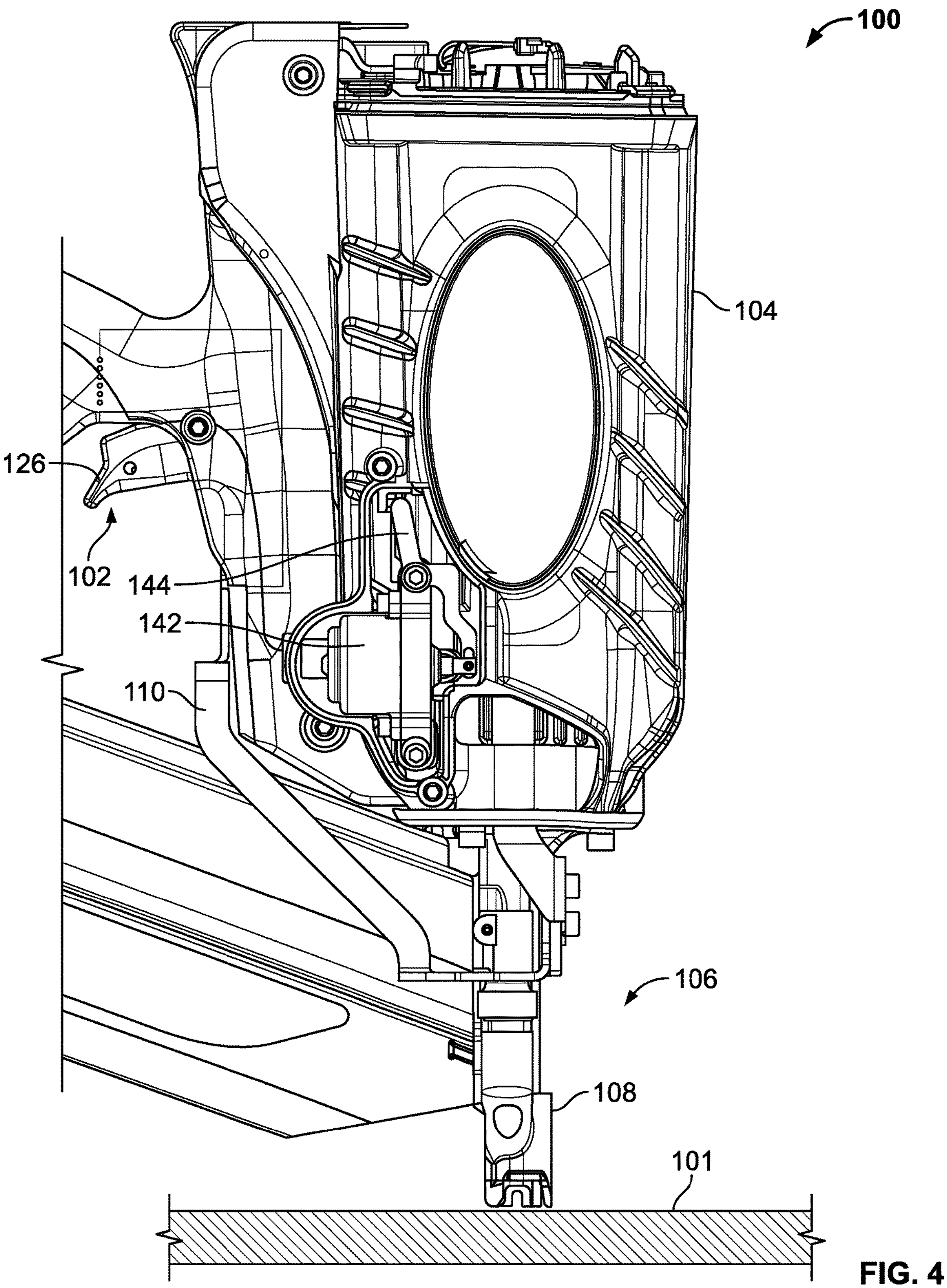
FIG. 4 is a cross-sectional view of the fastener-driving tool of FIG. 3 showing the chamber lockout device in a non-activated position.

Referring to FIG. 3-5, in the sequential operation mode, the workpiece contact element 108 of the combustion nailer 100 is pressed against a workpiece 101, which is a first actuation event, causing the workpiece contact element and the linkage 110 attached of the workpiece contact element assembly 106 to move upwardly within the housing 104. The linkage 110, which is connected with or integrally formed with the valve sleeve 132, reciprocally moves the sleeve upwardly and closes the combustion chamber 134, which also activates a head switch (not shown) adjacent to the chamber. The linkage 110 also contacts the actuation lever 124 causing the actuation lever 24 to move from a rest position to an activated position as shown in FIG. 5. In a second actuation event, a user presses the trigger 126 inwardly, i.e., activates the trigger, which in turn, depresses the stem 122 inwardly to activate it. After both the head switch and the stem 122 are activated, a spark is initiated to ignite the fuel mixture in the combustion chamber 134 thereby generating combustion. The combustion explosion within the chamber 134 drives piston 136 and driver blade 138 through cylinder 139 and into contact with a fastener 140 located in drive channel 141 to drive the fastener into a workpiece 101.

The user may now remove the tool from the workpiece 101 and repeat the above steps to continue in the sequential operational mode. Alternatively, to initiate the contact actuation mode (also referred to herein as the bump actuation mode), the user keeps the trigger 126 depressed or in the activated position. Upon this action, a processor 137 (FIG.

3) to activate a chamber lockout device 142 (FIG. 4), such as the lockout device described in commonly owned U.S. Pat. No. 7,383,974 and U.S. application Ser. No. 13/469,795, which are both herein incorporated by reference in their entireties. It should be appreciated that the lockout device 142 may be any suitable lockout device. In the illustrated embodiment, the lockout device 142 includes a pivot arm 144 that pivots between a lockout position (FIG. 6) where the pivot arm contacts and holds the valve sleeve 132 in the closed position so that the combustion chamber 134 remains closed, and a released position (FIG. 4) where the pivot arm is dis-engaged from the sleeve 132 so that the sleeve 132 may move to the open position.

Figure 6:
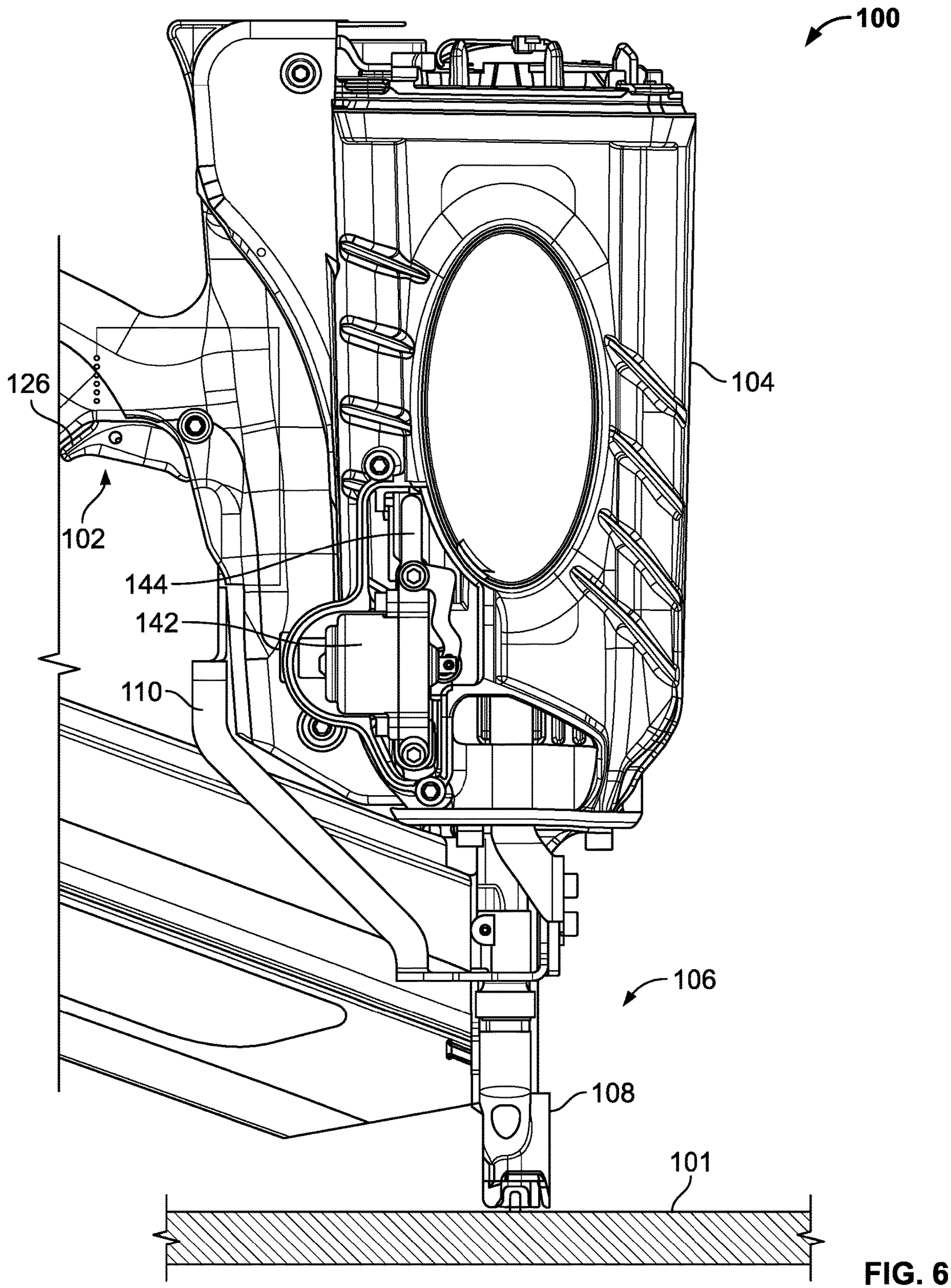
FIG. 6 is a cross-sectional view of the fastener-driving tool of FIG. 3 showing the chamber lockout device in the activated or lockout position.

Referring now to FIGS. 6-9, upon activation of the lockout device 142, the pivot arm 142 moves from the released position to the lockout position (FIG. 6). In the lockout position, an end of the pivot arm 142 engages and temporarily holds the sleeve 132 in the closed position and thereby keeps the combustion chamber 134 in the closed position to allow time for the piston to reach the top position in the cylinder. As discussed below, the processor is programmed to activate the lockout device for a designated period of time that is equal to or greater than the time needed for the piston to return to the top position of the cylinder. In the contact actuation mode, the processor bypasses the head switch so that the sequential sequence of first activating the head switch and then depressing the trigger 126 is not required to further actuate the combustion nailer 100 and drive fasteners 140 into the workpiece 101. Thus, in the contact actuation mode, the nailer 100 can be moved from one location to another location relative to the workpiece 101 without needing to repeat the actuation sequence discussed above.

Figure 7:
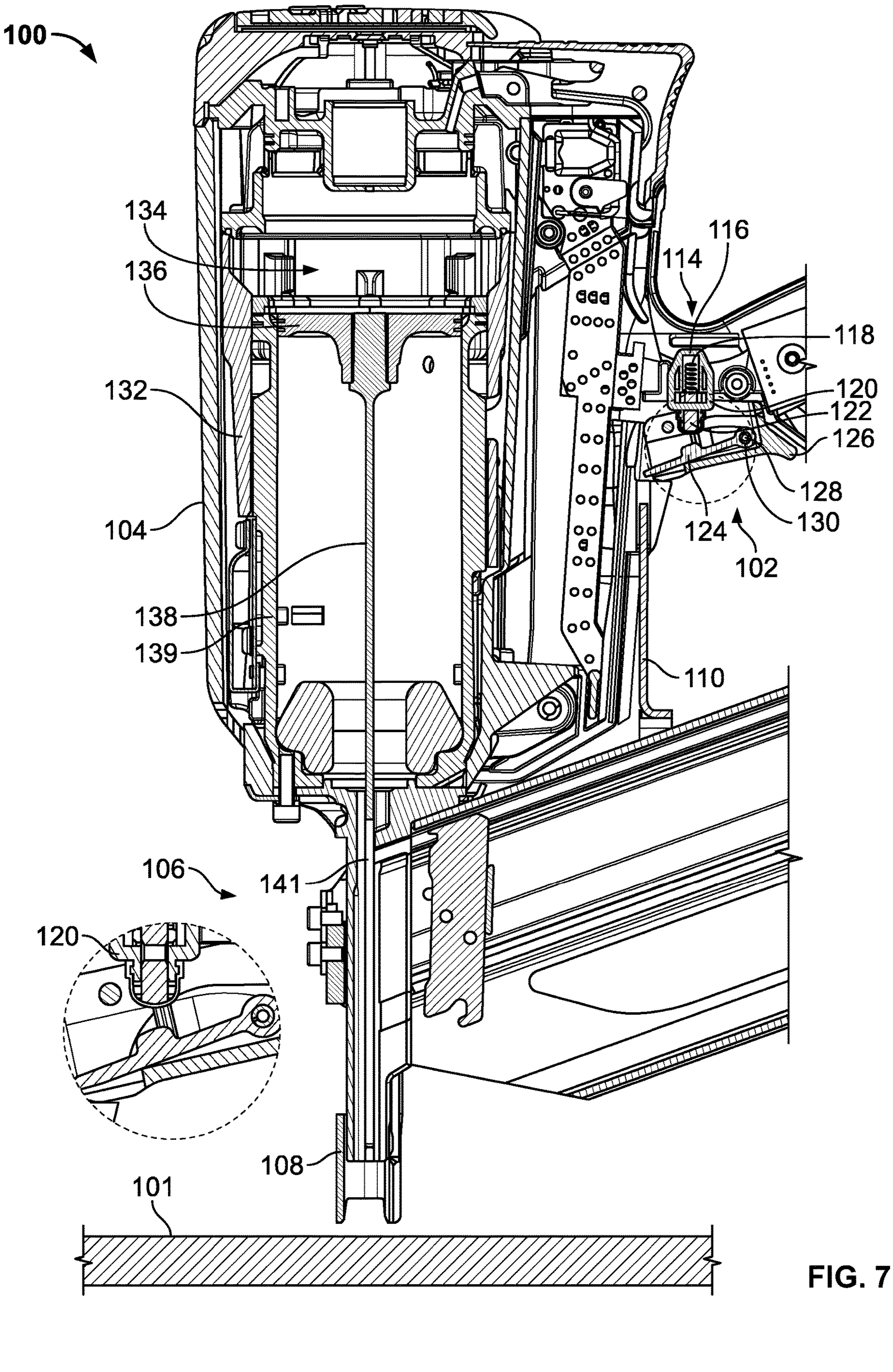
FIG. 7 is a cross-sectional view of the fastener-driving tool of FIG. 3 between actuations of the tool in the contact actuation mode, where the workpiece contact element has been removed from the workpiece causing the actuation lever to disengage from the actuation pin.
Figure 8:
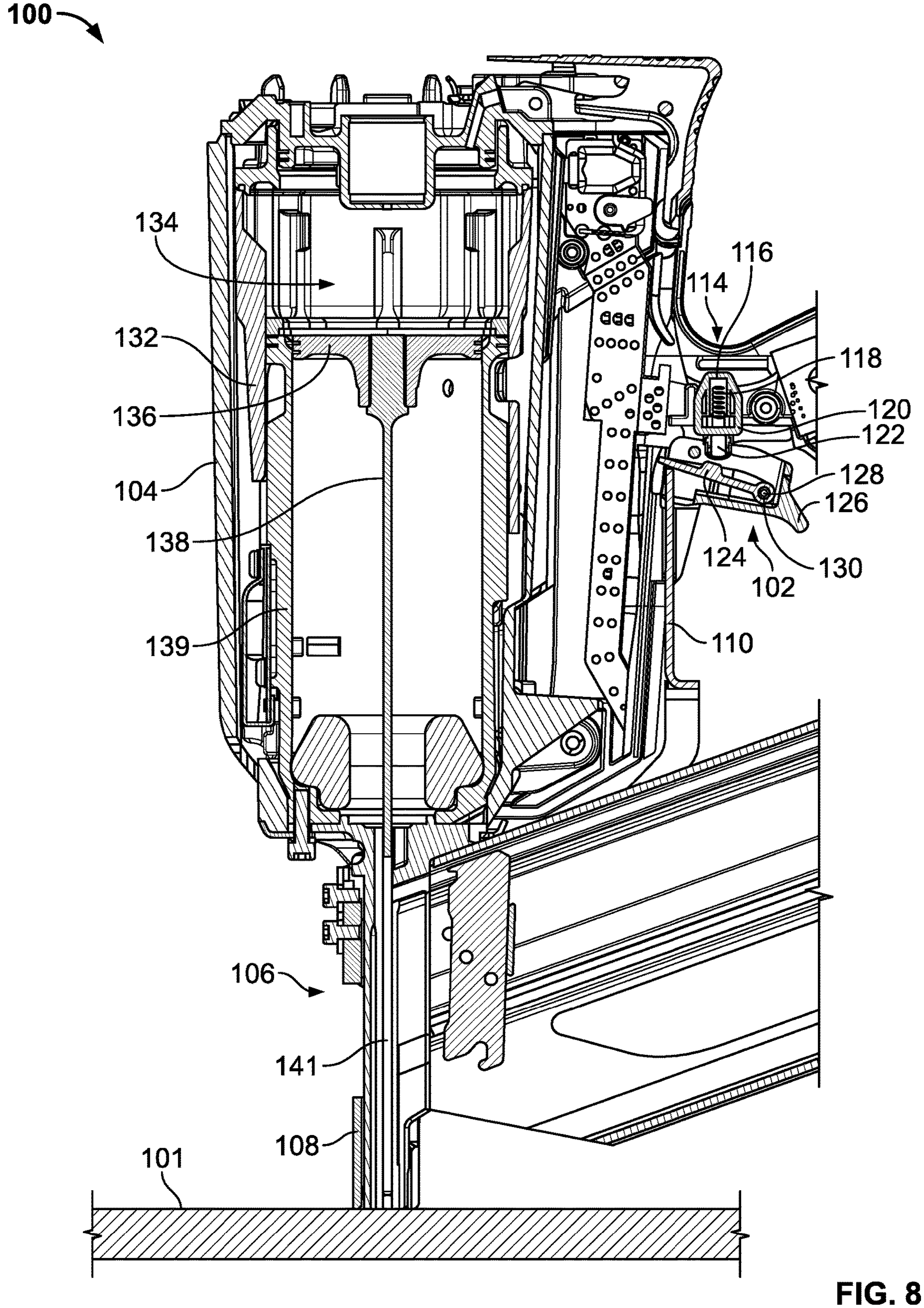
FIG. 8 is a cross-sectional view of the fastener-driving tool of FIG. 3, where the workpiece contact element is depressed against the workpiece and the trigger has been released thereby resetting the tool from the contact actuation mode to the sequential actuation mode.

When the nailer 100, and more specifically, the workpiece contact element 108, is removed from the workpiece 101 and the lockout device has been de-activated and disengaged from the sleeve, the workpiece contact element moves from the depressed or activated position to the non-depressed or rest position shown in FIG. 7. The nailer 100 is then moved, if needed, to a different location on the workpiece 101 and pressed against the workpiece. As described above, when the workpiece contact element 108 is pressed against the workpiece 101, the workpiece contact element 108 and the associated linkage 110 moves upwardly. When the linkage 110 moves upwardly, it contacts the actuation lever 124 and pushes the actuation lever to the activated position (FIG. 8) where it contacts and presses the stem 122 inwardly to initiate the combustion sequence described above. The combustion generated in the combustion chamber 134 causes the piston 136 and driver blade 138 to be driven through the cylinder to drive a fastener 140 into the workpiece 101.

As described above, the processor is programmed with a preset or designated lockout time period so that the lockout device 142 remains activated for the designated period of time to lock the valve sleeve 132 in position and keep the combustion chamber 134 closed. In an embodiment, the lockout device is activated for 100 msec in each actuation of the tool. It should be appreciated that the lockout time period may be any suitable amount of time.

The combustion nailer 100 remains in the bump actuation mode until a reset event occurs. Upon an occurrence of a reset event, the nailer 100 is reset to operate in the sequential operation mode. For example, a reset event may occur when the trigger 126 is released (FIG. 8) or when a fastener 140 has not been driven into the workpiece 101 (i.e., the tool has been inactive) for a designated amount of time, i.e., the reset time period. The processor is programmed with the reset time period where the reset time period may be any suitable amount of time. A user must now press the workpiece contact element 110 against the workpiece 101 or another workpiece and press the trigger 126 in this sequence to initiate the sequential actuation mode or the bump actuation mode.

The combination of the present trigger assembly 102 and the lockout device 142 enables the combustion nailer 100 to be operated in both a sequential activation mode and a bump actuation mode. Such flexibility in operation of the nailer 100 enables users to be able to easily switch from a sequential operation mode to a bump actuation mode at a jobsite without having to switch tools thereby saving significant time and cost.

While a particular embodiment of a combustion-powered fastener-driving tool has been described herein, it will be appreciated by those skilled in the art that changes and modifications may be made thereto without departing from the invention in its broader aspects and as set forth in the following claims.

What is claimed is:

1. A method of operating a fastener-driving tool having an electronic control device, a workpiece contact element, and a trigger, said method comprising:

when the fastener-driving tool is in a sequential actuation mode, responsive to the workpiece contact element moving from a workpiece contact element rest position to a workpiece contact element activated position followed by the trigger moving from a trigger rest position to a trigger activated position, initiating fastener driving;

when the fastener-driving tool is in the sequential actuation mode, responsive to the trigger remaining in the trigger activated position after fastener driving, causing via the electronic control device, the fastener-driving tool to switch from the sequential actuation mode to a contact actuation mode; and when the fastener-driving tool is in the contact actuation mode, responsive to the workpiece contact element moving from the workpiece contact element rest position to the workpiece contact element activated position, initiating fastener driving.

2. The method of claim 1, wherein when the fastener-driving tool is in the contact actuation mode, responsive to an occurrence of a designated event, causing via the electronic control device, the fastener-driving tool to switch from the contact actuation mode to the sequential actuation mode.

3. The method of claim 2, wherein the designated event includes fastener driving not occurring for a designated period.

4. The method of claim 2, wherein the designated event includes either of the trigger moving from the trigger activated position to the trigger rest position or fastener driving not occurring for a designated period.

5. The method of claim 1, which includes, when the workpiece contact element moves from the workpiece contact element rest position to the workpiece contact element activated position: (a) causing a sleeve of the fastener-driving tool to move from a first position in which a combustion chamber of the fastener-driving tool is open to a second position in which the sleeve closes the combustion chamber; and (b) causing via the electronic control device, a lockout device of the fastener-driving tool to move from a lockout device rest position to a lockout device activated position to engage the sleeve.

6. The method of claim 5, wherein when the fastener-driving tool is in the contact actuation mode, responsive to fastener driving, causing via the electronic control device, the lockout device to hold the sleeve in the second position for a designated period.

7. The method of claim 1, wherein the electronic control device includes a processor.

8. A method of operating a fastener-driving tool having a combustion chamber, a sleeve, a lockout device, a workpiece contact element, and a trigger, said method comprising:

when the workpiece contact element is actuated, causing the sleeve to move to a position that closes the combustion chamber and causing the lockout device to hold the sleeve in said position;

when the fastener-driving tool is in a sequential actuation mode, each time the workpiece contact element and the trigger are actuated in a designated sequence, causing combustion in the combustion chamber to drive one of a plurality of fasteners;

responsive to the trigger remaining actuated following fastener driving, causing, via an electronic control device, the fastener-driving tool to switch from the sequential actuation mode to a contact actuation mode responsive; and when the fastener-driving tool is in the contact actuation mode, each time the workpiece contact element is actuated, causing combustion in the combustion chamber to drive another one of the plurality of fasteners.

9. The method of claim 8, which includes when the fastener-driving tool is in the contact actuation mode, responsive to fastener driving, causing via the electronic control device of the fastener-driving tool, the lockout device to hold the sleeve in the position that closes the combustion chamber for a designated period.

10. The method of claim 8, which includes when the fastener-driving tool is in the contact actuation mode, when the workpiece contact element is actuated, causing the sleeve to move to the position that closes the combustion chamber, causing the lockout device to engage the sleeve, and causing via the electronic control device, the lockout device to hold the sleeve in said position that closes the combustion chamber for a designated period.

11. The method of claim 8, wherein when the fastener-driving tool is in the sequential actuation mode, causing via the electronic control device, the fastener-driving tool to switch from the sequential actuation mode to the contact actuation mode responsive to the trigger remaining in an actuated position after fastener driving.

12. The method of claim 8, wherein when the fastener-driving tool is in the sequential actuation mode, causing via the electronic control device, the fastener-driving tool to switch from the sequential actuation mode to the contact actuation mode until a designated event occurs.

13. The method of claim 12, wherein the designated event includes either of the trigger moving from a trigger activated position to a trigger rest position or fastener driving not occurring for a designated period.

14. The method of claim 12, wherein the designated event includes fastener driving not occurring for a designated period.

15. The method of claim 8, wherein the electronic control device includes a processor.

16. A method of operating a fastener-driving tool, the fastener-driving tool including a housing, a combustion chamber in the housing, a workpiece contact element connected to the housing, a trigger connected to the housing, an actuation lever connected to the trigger, a sleeve in the housing, a lockout device supported by the housing, and an electronic control device supported by the housing and configured to control the lockout device, the method comprising:

when the fastener-driving tool is in a sequential actuation mode, each time the workpiece contact element and the trigger are actuated in a designated sequence, generating combustion in the combustion chamber to drive one of a plurality of fasteners;

when the fastener-driving mode is in the sequential actuation mode, causing, via the electronic control device, the fastener-driving tool to switch from the sequential actuation mode to the contact actuation mode responsive to the trigger remaining in the actuated position after fastener driving;

when the fastener-driving tool is in the contact actuation mode in which the trigger remains actuated following fastener driving when the fastener-driving tool is in the sequential actuation mode, each time the workpiece contact element is actuated, generating combustion in the combustion chamber to drive another one of the plurality of fasteners; and when the fastener-driving tool is in the contact actuation mode, responsive to fastener driving, causing, via the electronic control device, the lockout device to hold the sleeve in a combustion chamber closing position for a designated period.

17. The method of claim 16, wherein when the fastener-driving tool is in the sequential actuation mode, causing via the electronic control device, the fastener-driving tool to switch from the sequential actuation mode to the contact actuation mode until a designated event occurs.

18. The method of claim 17, wherein the designated event includes fastener driving not occurring for a designated period.

19. The method of claim 17, wherein the designated event includes either of the trigger moving from a trigger activated position to a trigger rest position or fastener driving not occurring for a designated period.

20. The method of claim 17, wherein the electronic control device includes a processor.

* * * * *